United States Patent [19]

Cooper

[11] 3,870,011

[45] Mar. 11, 1975

[54] COMBINED MOTOR HOME AND YACHT

[76] Inventor: Herbert Cooper, 1 Tom's Point Ln., Port Washington, N.Y. 11056

[22] Filed: July 27, 1973

[21] Appl. No.: 383,376

[52] U.S. Cl. .............................. 115/0.5 A, 114/60
[51] Int. Cl. .............................................. B63h 1/00
[58] Field of Search ............ 115/.5 A, 1 R; 114/146, 114/60, 144 R, 75, 70

[56] References Cited
UNITED STATES PATENTS

| | | | |
|---|---|---|---|
| 2,365,830 | 12/1944 | Miller | 115/.5 A |
| 2,898,877 | 8/1959 | King | 114/60 |
| 2,914,016 | 11/1959 | Sweeny | 115/.5 A |
| 2,997,012 | 8/1961 | Ozkok | 115/.5 A |
| 3,011,184 | 12/1961 | Curcio | 115/.5 A |
| 3,027,862 | 4/1962 | Votre | 115/1 R |
| 3,083,670 | 4/1963 | Harlander et al. | 114/75 |
| 3,270,827 | 9/1966 | Mantle | 115/.5 A |
| 3,570,439 | 3/1971 | Snelling | 114/60 |
| 3,599,593 | 8/1971 | Fleming | 115/.5 A |

FOREIGN PATENTS OR APPLICATIONS

| 1,445,795 | 6/1966 | France | 115/.5 A |
|---|---|---|---|

Primary Examiner—Trygve M. Blix
Assistant Examiner—Edward Kazenske
Attorney, Agent, or Firm—Homer J. Bridger

[57] ABSTRACT

A road vehicle such as a motor home has a chassis provided with a plurality of road-engaging and spring-mounted wheels and with an engine for moving this chassis along the ground. A driver's station and living quarters are also provided on this chassis. A yacht hull has a deck formed with an upwardly open well whose edge is formed as a seat for the chassis of the road vehicle. Support elements operated by scissor linkages displace the road vehicle vertically into and out of the well, and clamps and positioning pins are provided to secure the chassis securely to the seat, with the vehicle's wheels hanging freely into the well. The steering wheel, shift lever, and other control elements at the driver's station in the road vehicle are connected to the drive and guidance systems of the yacht hull for operation of the yacht from this station or a pilot's station may be provided on the chassis and so connected. In addition a pivotal deck may be closed down over the roof of the road vehicle so as to provide extra deck space.

6 Claims, 12 Drawing Figures

3,870,011

COMBINED MOTOR HOME AND YACHT

FIELD OF THE INVENTION

The present invention relates to a vehicle. More particularly this invention concerns a combined road vehicle and a watercraft.

BACKGROUND OF THE INVENTION

So-called boat cars are known which can travel on roads in the conventional manner, and which also can run like a boat in the water. Such vehicles usually have rear-wheel drive and front-wheel steering. In addition a screw is provided to propel the vehicle in the water, steering at this time being effected by the front wheels which act as twin rudders.

Such an arrangement has never passed the novelty stage as it usually has all the disadvantages of a road vehicle and all those of a watercraft combined. It is slow on the road compared to other automobiles and is slow in the water compared to other boats. This is caused principally by using an engine which is set up to serve both as an automobile engine and as a marine engine, doing neither job well. The guidance arrangement is similarly clumsy and inadequate.

It has further been suggested to mount a house trailer or a motor home on a self-powered vessel. In this manner the owner of the trailer can live right on the water in quarters to which he is accustomed. This arrangement is impractical since the spring-mounted mobile home sways on the vessel and the rocking caused by the waves is amplified by the spring mounting of the road vehicle to the discomfort of the inhabitants. Furthermore, because of such reinforced motion, securing such a vehicle to a vessel is a very difficult operation. A pilot's cabin must be provided for guiding the boat, and the pilot must invariably go outside to return to the living quarters.

Another problem with such prior-art arrangements is that the road vehicle is not fully integrated with the seagoing craft. The combination usually is not particularly seaworthy; indeed, the watercraft usually has all the elegance and seakeeping qualities of a barge. For this reason a discriminating boater interested in passing his leisure time part on land and part on the water must abandon his motor home or vehicle and transfer his possessions to a yacht in order to enjoy the water on a good watercraft.

OBJECTS OF THE INVENTION

It is therefore an object of the present invention to provide an improved vehicle.

Another object is the provision of an improved combined vehicle for land and/or water which does not suffer from the above-mentioned disadvantages.

A further object is to provide a system whereby a self-propelled road vehicle may be operated on the water.

Another object of my instant invention is the provision of a combined road vehicle and watercraft which travels well on land and on water.

SUMMARY OF THE INVENTION

These objects are attained according to the present invention in a vehicle which in order to travel on the water is fitted to a yacht-like hull provided centrally with a well. A motor-home module of the type provided with its own drive engine and having spring-mounted wheels for traveling on the roads is fitted onto this hull with its chassis resting on and secured to a seat around the edge of the well directly supporting same and disengaging the spring-mounted wheels from weight support functions. In addition means is provided to position and secure the chassis to the hull in its seated position and connections may be provided to means for piloting the boat directly from the driver's seat of the motor-home module.

According to another feature of my present invention the hull is adapted to ride at a predetermined level in the water, that is its waterline for proper seakeeping lies at a predetermined level on the hull. Absent the land vehicle this hull floats higher, i.e., its waterline is above the water level, but with the land vehicle in place it rides at the level at which the watercraft is designed to be operated. Thus a highly seaworthy watercraft is obtained, one capable of cruising at respectable speeds.

In accordance with another feature of this invention the hull is provided with its own marine drive engine. In this manner the engine of the motor-home module, which must meet altogether different requirements, is shut down and the entire vehicle is run on a marine engine particularly adapted to marine requirements.

According to yet another feature of the present invention means is provided on the hull in the well to raise and lower the motor-home module so as to permit it to be removed from the hull as by being lifted off by the common forklift or hoist used in boatyards to haul boats. These devices are jacks engageable with the wheels so as to make it possible for the lifting arrangement to reach under the motor-home module to lift it free of the hull.

The well on the hull is formed according to this invention in such a manner that the chassis of the motor-home module seats and rests directly on it and the passengers may step directly from the living quarters of the motor-home module onto the deck of the yacht. As the module is not supported on springs and its wheels, it forms with the hull a stable composite unit with independent movement impossible for its components.

Such an arrangement allows the owner of a motor home to have his vehicle fitted onto a yacht hull so that he may travel on the water. The watercraft so formed is piloted directly from the driver's seat so that minimum of changeover is required. In addition the mobile homedwellers do not need to transfer their effects to set up housekeeping again when they go yachting. Practically everything but the medium on which they are traveling remains the same. When the yacht has arrived at the selected port it is a simple matter for the occupants to disconnect their motor home and do local touring on the local roads. A reliable marine motor, which is operated from the driver's seat of the motor home, powers the yacht so that the abnormal strains of operating an automobile engine in the manner necessary to provide proper power for watercraft is eliminated. Of course the land vehicle need not be a motor home complete with living quarters. A jeep or other passenger vehicle may be employed so that the convenience of having a comfortable pilot's station is combined with the provision of one's vehicle on the watercraft. Snugly securing the automobile of the watercraft's pilot to the watercraft gives him the option of using it when he arrives in port without having to bother with car-rental agencies. The seating of the car in a well on the hull's deck according to this invention

3 protects the car from much of the wear and tear usually inherent with deck storage of a vehicle.

DESCRIPTION OF THE DRAWING

The above and other objects, features, and advantages will become more apparent from the following with reference to the accompanying drawing in which.

SPECIFIC DESCRIPTION

Figure 1:
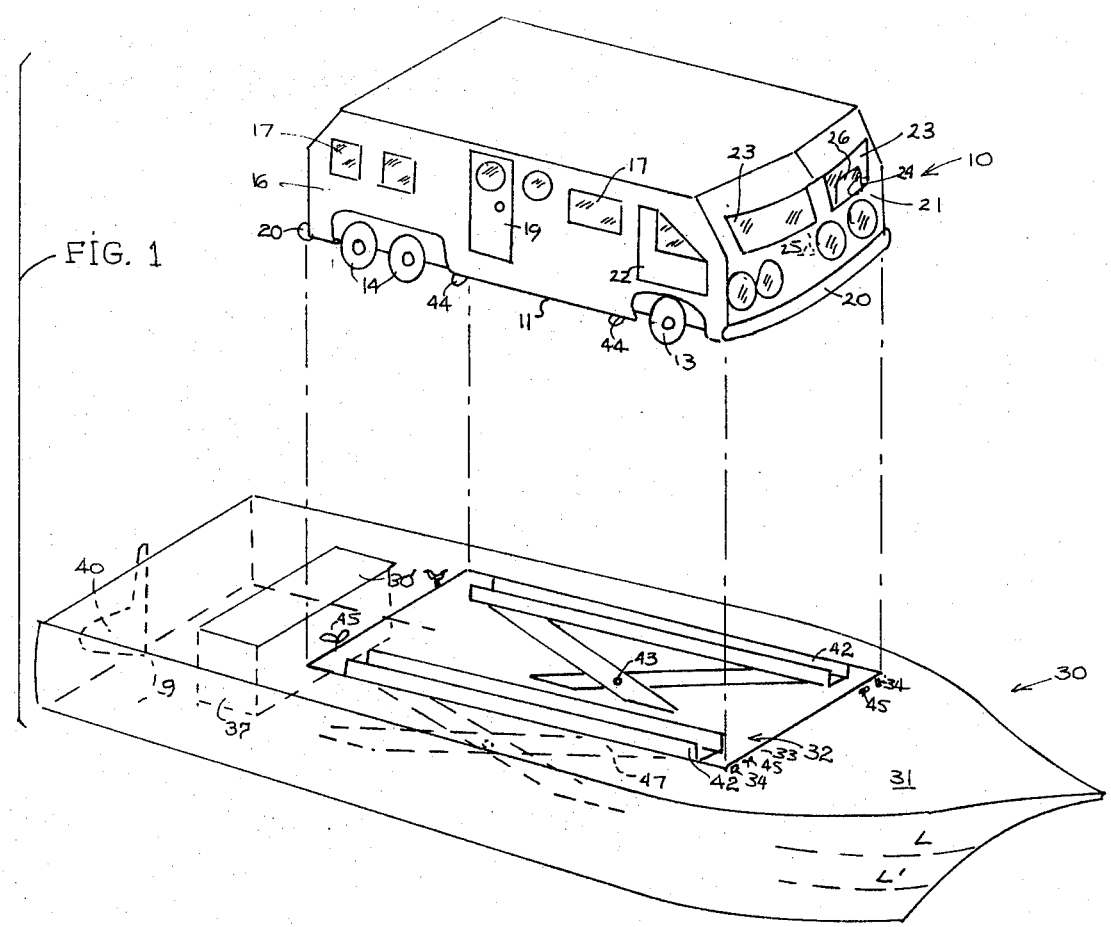
FIG. 1 is a perspective view showing a motor home being lowered onto a yacht hull according to the present invention.

As shown in FIG. 1 a motor-home module 10 has a chassis 11 from which depend two front wheels 13 and four rear wheels 14, all secured by means of conventional springs to this chassis 11. The rear end of the chassis 11 is provided with living quarters 16 having windows 17 and at least one lateral access door 19. The front end of the module 10 is provided with a driver's compartment 21 having an access door 22 and a windshield 23. When on the road the front wheels 13 are controlled for turning by a steering wheel 24 at the driver's station 21. The drive motor for the module when in land service is indicated at 25 in phantom lines under the driver's seat 26.

FIG. 1 also shows a yacht hull 30 having deck 31 formed with a well 32 whose edge 33 is reinforced and formed as a seat. Well edge 33 has near its corners upstanding conical locating pins 34 adjustably positionable and adapted to fit snugly into recesses 12 (FIG. 3) in the chassis 11 which rests snugly all around on this seat 33. The deck 31 of the hull 30 is provided with a safety rail. This hull has a marine motor 37 underneath a rear hatch 30' and connected to a drive screw 38 to propel this vehicle in the marine mode. A rudder 40 steers the watercraft and is remotely controlled either from the driver's station in the motor home or from a steering station on the hull.

Figure 2:
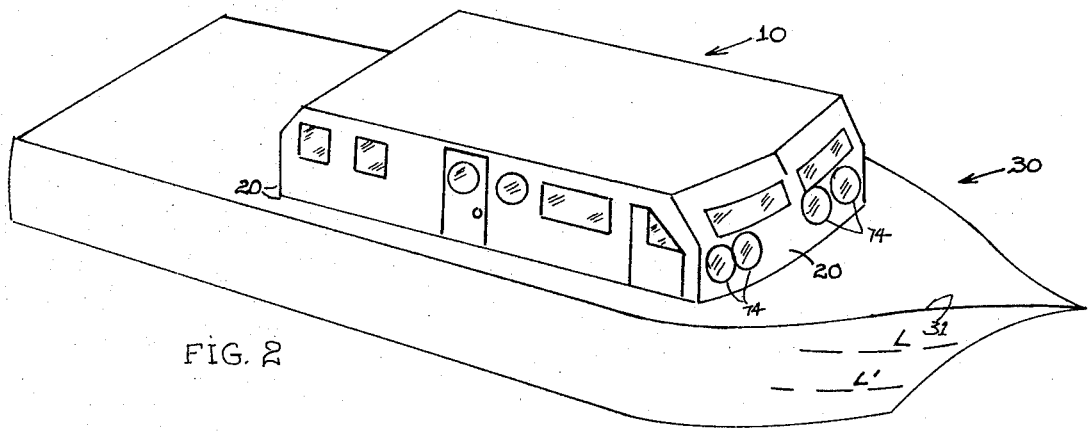
FIG. 2 is a perspective view of the combined motor-home vehicle and yacht hull according to this invention.

This motor home 10 is secured to the seat 33 on the hull by first positioning its wheels 13 and 14 on a pair of upwardly open parallel channels 42 mounted on respective scissor linkages 43 to the hull. These channels 42 may be replaced by a support plate. Either the entire motor home is set onto the lifted channel supports by a giant forklift whose forks are indicated at 44 (FIG. 1) as is used in the so-called "high-and-dry" marinas or by a boat hoist, or the vehicle 10 is driven onto the deck 31 from the dock via a ramp or the like onto the appropriately raised and positioned channels 42. When the channels 42 are lowered the chassis 11 fits snugly with the seat 33, as is shown in FIG. 2. Clamps 45 are conveniently engaged over the front and rear bumpers 20 of the module 10, but similar clamping means appropriately distributed around as at 33 may be used to rigidly fasten the module 10 to the hull 30.

The hull 30 is adapted to ride at a level L in the water. Absent the motor home 10 it rides, however, at a higher level L' at which the hull's seakeeping is not good. At the level L the yacht can be operated at 30 knots or more, so that the combination 10, 30 is fast and useful for serious boating.

Figure 3:
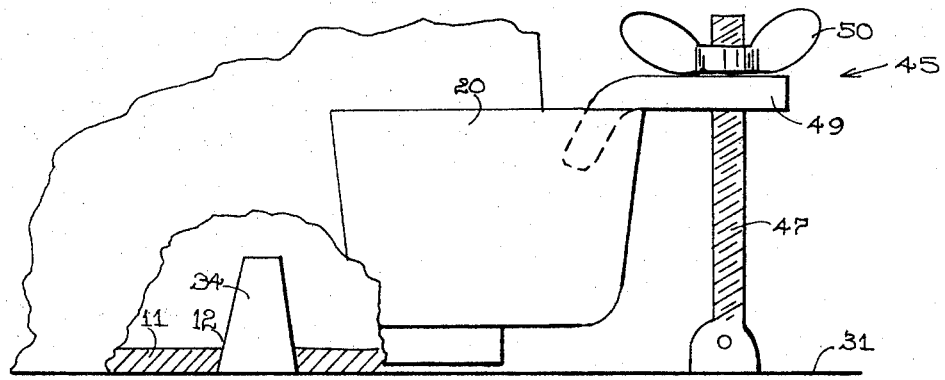
FIG. 3 is a side view, partly in section, illustrating how the motor home is secured to the hull.

FIG. 3 shows a section through a corner of the vehicle indicating how the conical pins 34 fit snugly into the recesses 12 in the chassis 11. The clamps 45 each comprise a pivotally mounted threaded spindle 47 over which is slipped a holddown bracket 49 engageable over and behind a bumper 20. A large wingnut 50 rotatable on the spindle 47 pulls this holddown bracket 49 tight. In this manner the chassis 11 is secured so rigidly to the deck 31 that the vehicle 10 and the hull 30 form a single unit. The well 32 is deep enough so that the spring-mounted wheels 13 and 14 of the vehicle 10 are freed of all weight from the vehicle module. The weight of module 10 is distributed along edge 33 of the well 32 which is reinforced to support the weight evenly and prevents concentration of weight as would occur if the weight of vehicle 10 were transmitted to the hull 30 only via the wheels 13 and 14.

Figure 4:
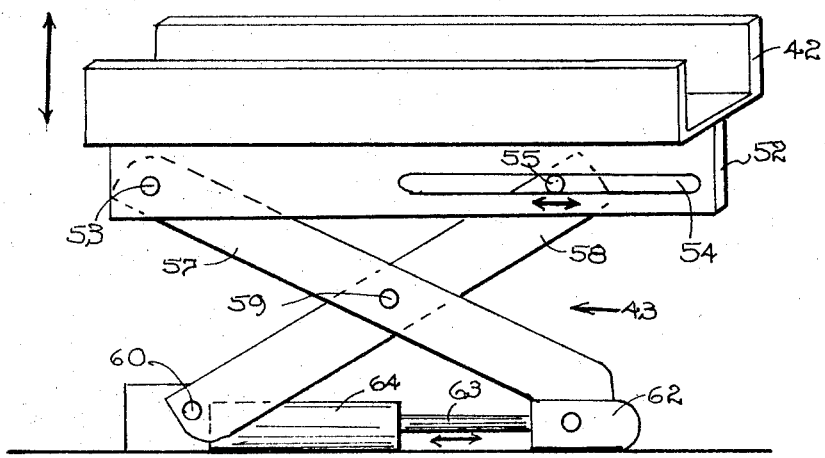
FIG. 4 is a perspective view of a detail of FIG. 1, in enlarged scale.

FIG. 4 shows the arrangement for lifting and positioning the motor home on to the seat 33. Each upwardly open steel channel 42 is supported on a vertical plate 52 provided at its rear end with a fixed pivot pin 53 and near its front end with a horizontally elongated slot 54 in which a pin 55 may slide. The upper end of one scissor arm 57 of the respective linkage 43 is pivoted at 53 and the upper end of the other scissor arm 58 is provided with the pin 55, the two arms 57 and 58 being pivoted together centrally at 59. The lower end of the arm 58 is pivoted on the hull 30 at a fixed pivot 60 and the lower end of the other arm is pivoted on a fork 62 carried on the end of an actuating piston rod 63 of a jack or hydraulic ram 64 secured to the base of the well 32. The channels are lowered to transfer the weight of the motor home from the wheels 13 and 14 to the reinforced edges 33 of the well 32. Wheels 13 and 14 may remain in place in channels 42 or the channels may be lowered sufficiently to disengage the wheels and permit movement of front wheels 13.

It should be noted that, in addition to better weight distribution, by transferring the weight from the wheels to the entire body, the mobile home is disengaged from its springs. As pointed out above, marine motions caused by waves tend to be exaggerated and reinforced by the springs of the vehicles. Seasickness during long ferry rides is more common among the occupants of the transported vehicles than among pedestrians on the ferry. This is overcome by releasing the mobile unit from its springs. Another advantage is the reduction of movement normally resulting from spring-supported structures.

Figure 5:
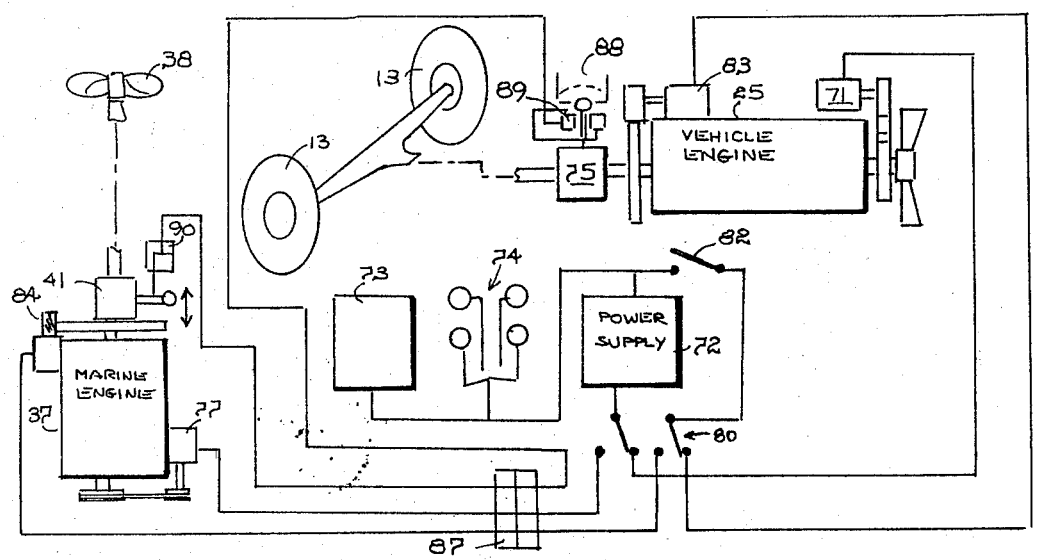
FIG. 5 is a diagrammatic view of combined drive and control systems of the vehicle for land and marine operation according to this invention.

FIG. 5 shows the interconnection of the various systems of the boat and the motor home. The engine 25 of the vehicle 10 operates a generator 71 which charges the battery of the electric-power supply 72 which serves to light the vehicle and operate the refrigerator 73 and other electrical appliances as well as the headlights 74. In addition of course the engine 25 powers drive wheels 14 through an automatic transmission 75 whose control lever 88 is operated from the driver's seat 26. Engine 25 also powers the power steering unit for wheels 13 controlled by steering wheel 24.

As also shown in FIG. 5 the marine engine 37 operates the screw 38 through a reversible transmission 41 and also drives a generator 77. When the motor-home module 10 is engaged with the hull 30 a mode switch 80 is thrown to change over two circuits: One, the refrigerator 73, headlights 74, and other not illustrated electrical systems of the home 10 are connected through the power supply 72 to the generator 77 rather than to the generator 71 of the vehicle engine 25. Two, the starter switch 82 of the vehicle 10 is connected instead of to the starter 83 and ignition circuits of the engine 25 to the starter 84 and ignition circuits of the marine engine 37. A plug-in connector 87 is provided for connection of the generator 77 and starter motor 84 to the switch in the motor home 10.

In this manner the engine 25 of the motor-home module 10 is shut down when this vehicle is used as living quarters and pilot's cabin in conjunction with the yacht hull 30. Instead the marine engine 37 of the slow-speed type which can operate for long periods of time at substantially constant speeds is used both to power the boat 30 through the water and to furnish the electricity for the various systems of the motor home 10. Obviously further connections may be made through the plug 87 with further contacts on the switch 80 to operate, for instance, the boat's running lights off the vehicle's headlight switch, much as the starter switch 82 serves double duty. In addition the connector 87 can connect various sensors on the motor 37 to contacts on the switch 80 to allow the gas gauge, temperature indicator, tachometer, and like instruments in the driver's compartment 21 to function for the marine engine 37. However a separate marine operation panel may be installed in the motor home which is connected via plug-in connectors to the appropriate signal and operating sources in the hull.

The shift lever 88 for the transmission 75 of the motor home 10 is connected to switches 89 which are also connected through the plug connector 87 to a spring-loaded solenoid 90 operating the transmission 41. In this manner the transmission for the marine engine 37 may be shifted between reverse and forward by the conventional shift lever of the motor home 10.

Figure 6:
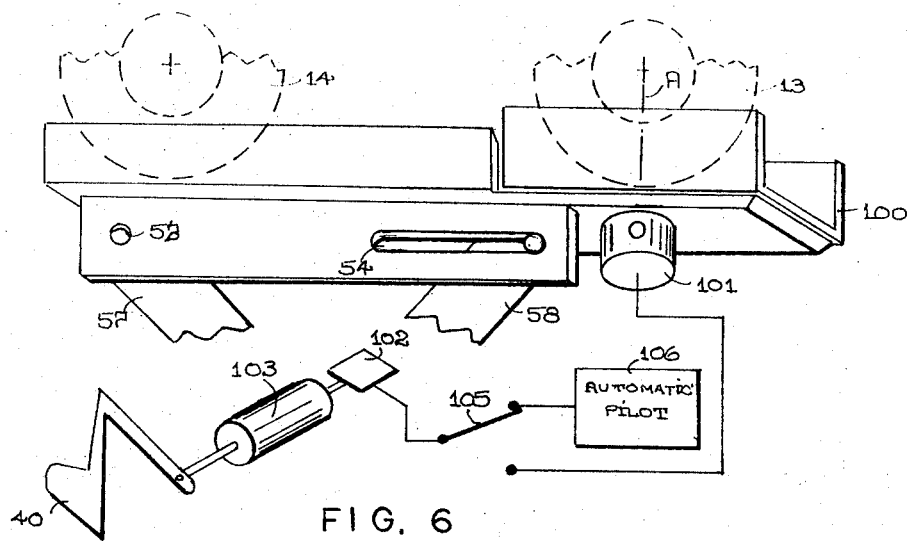
FIG. 6 is a perspective view partly in diagrammatic form illustrating a guidance system for marine operation of the present invention.

FIG. 6 shows an optimal steering mode for the vehicle wherein one or both of the channels 42 can be cut away at its front end and provided with a substantially higher-extending channel 100 which is pivotal on the channel 42 about a vertical axis A which passes through the vertical rotation axis of the respective front wheel 13 received therein. A Selsyn motor 101 is driven by this channel 100 and is connected to another Selsyn 102 which operates the pilot piston of a ram 103 that in turn guides the rudder 40 of the boat 30. A switch 105 may connect this Selsyn 102 to an automatic pilot which may be secured to the boat 30 permanently or may be mounted in the motor home 10 and connected with the switch 105 between the servomotors 101 and 102 via the connector plug 87. The steering ratios are arranged such that one revolution of steering wheel 24 corresponds to a lock-to-lock swing of the rudder 40.

Figure 7:
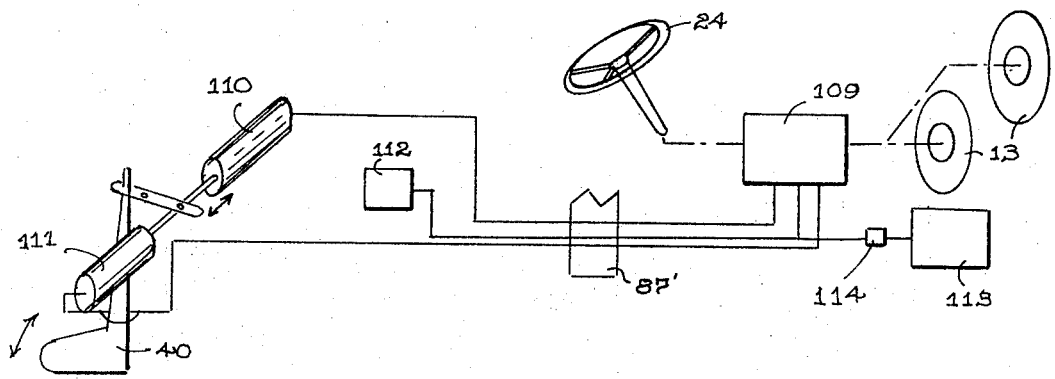
FIG. 7 is a diagrammatic view of another guidance system for this invention.

Instead of the arrangement of FIG. 6 it is possible to connect the back and front chambers of the power-steering unit 109 of the motor home 10 to slave cylinders 110 and 111 which operate the rudder 40 by means of a snap fitting 87' as shown in FIG. 7. In this arrangement the power-steering unit 109 is pressurized externally by means of a hydraulic pump 112 on the engine 37 when the vehicle is in marine operation. The pump 113 of the motor home is connected via a check valve 114 to the unit 109 so as to prevent backflow during marine operation, and the returns are similarly connected with check valves for a safe system. The fitting 87' is of the type which only permits fluid flow when its two halves are engaged by means of interfitting pins and ball valves so that no leakage will occur when they are not coupled together.

Figure 8:
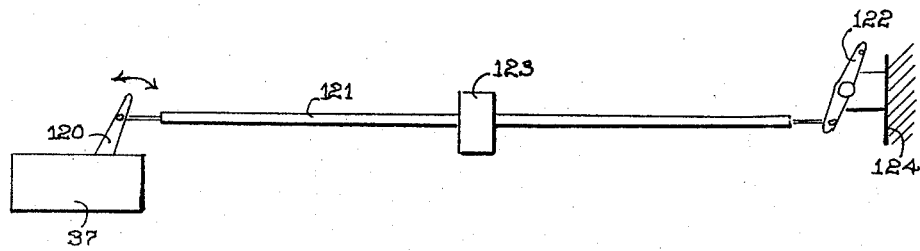
FIG. 8 is a diagrammatic view of a throttle control according to the present invention.

The throttle 120 of the boat is connected via a bowden cable 121 to a boat-throttle lever 122 on the dashboard 124 of the motor home 10 by means of a releasable snap fitting 123 as shown in FIG. 8. Since a motor home is usually provided with a hand throttle to allow its engine to be run at a speed faster than idle it is preferable to couple the bowden cable to this element. During marine operation it is preferable to uncouple it from the motor home's carburetor to prevent constant pumping of gasoline into this carburetor. The accelerator pedal of the motor home 10 is preferably not used during marine operation because the speed of the marine engine 37 is customarily set to be substantially constant for long periods of time. Major variations in motor speed are primarily for maneuvering during docking operations. Use of the conventional accelerator pedal would require the pilot to operate this pedal down at all times.

The arrangements described above with reference to FIGS. 4-8 allow the driver accustomed to his motor home to pilot his home/yacht 10/30 from his customary driver's seat 26 using the steering wheel 24, shift lever 88, and ignition switch 82 to which he is completely accustomed. Only the throttle is different between the two vehicles 10 and 30, and its operation presents no problems. As discussed above the ancillary controls and other devices such as lights, tachometer, gas gauge, temperature gauge, oil-temperature gauge, and the like can also be connected to function for the motor 37. For switching from road to marine use the vehicle 10 is set on the channels 42, the connector 87 is coupled, the switch 80 is thrown, the vehicle 10 is lowered and clamped by the devices 45, and the driver, now a pilot, can then operate his boat from the same station using the same control elements used to drive the road vehicle. The hull 30 can be relatively inexpensively produced as it need merely have the minimum essentials to keep it afloat and displace it through the water. Most of the various controls are already provided on the motor home 10 and serve also for this marine vehicle 30. The controls of the motor home 10 are as compatible with the systems of the hull 30 as the chassis 11 is with the deck 31.

Figure 9:
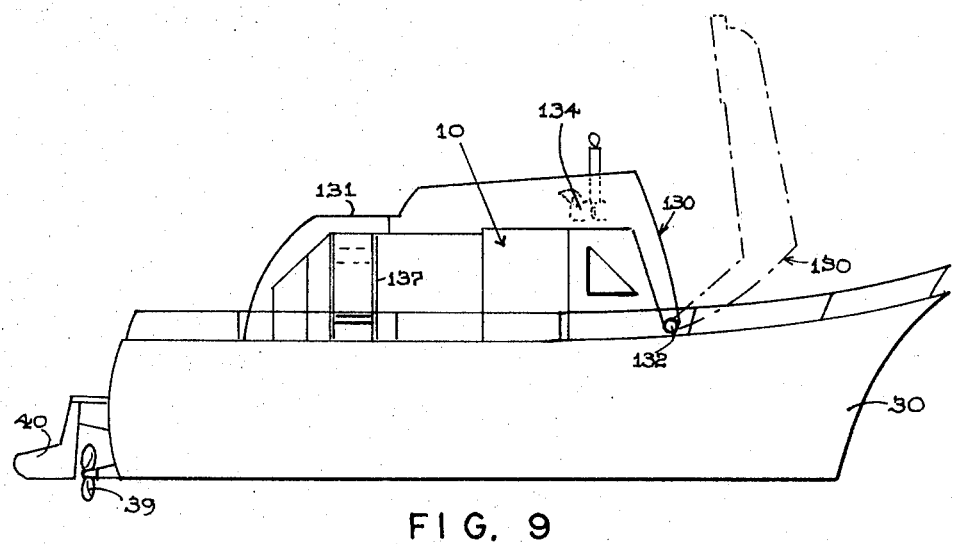
FIG. 9 is a side view of an alternative form of yacht hull according to this invention.

FIG. 9 shows how the hull 30 can be provided with a deck unit 130 having an auxiliary deck 131 hinged at 132 between the well 32 and the bow of the hull 30 so as to be displaceable into the position shown by dot-dash lines in which it provides access of motor-home module 10 to the well 32. A ladder 137 is provided to allow the passengers of the boat to ride on top of their mobile home 10 as an upper deck. In addition this cover 130 has a railing and also a station 134 for mounting a duplicate set of marine operation controls for on-deck piloting. It also has a more conventional yacht appearance.

Figure 10:
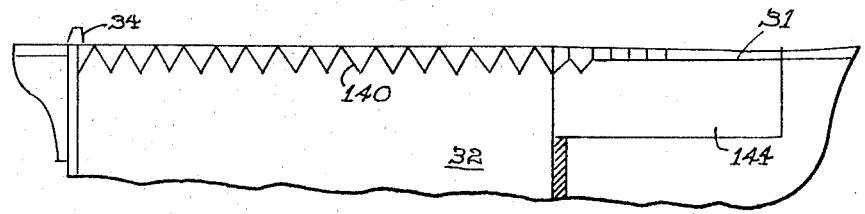
FIG. 10 is a vertical section through the hull shown in FIG. 1, in enlarged scale.

The well 32 of the hull 30 is provided as shown in FIG. 10 with an accordion-pleated cover 140 which can be pulled out of a storage chamber 144 forward of the well 30 under the deck 32. In this manner when the motor home is not in place the well 32 and its mechanisms are protected.

Figure 11:
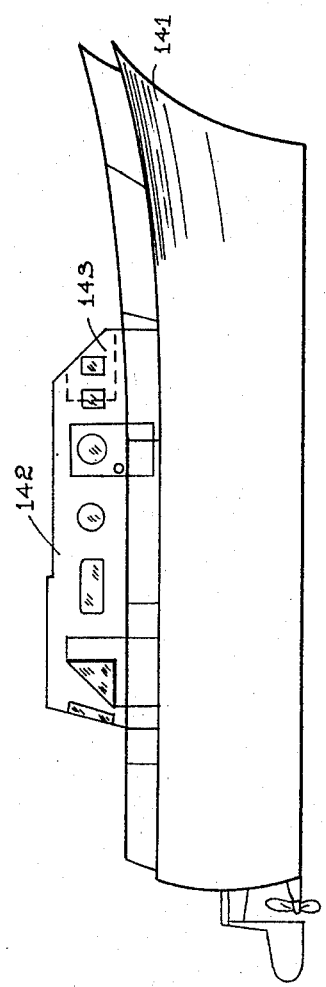
FIG. 11 is a side view of a further embodiment of this invention.

As shown in FIG. 11 a hull 141 identical to the hull 30 may be fitted with a motor home 142 which is identical to the home 10 in all respects except that it is provided with a rear pilot's cabin 143. To accommodate this type of vehicle the well on the hull 141 is adapted to accept the vehicle 142 with its compartment 143 toward the bow of the boat. In this arrangement of course an entire separate set of controls is provided on the vehicle 142 and a large multicontact connector is provided to hook the controls at the pilot's station 143 to the various guidance systems of the boat 141.

It should be noted with respect to all the embodiments discussed above that the vehicle secured to the hull need not necessarily be a motor home. A simple two-, four-, or six-passenger car or a truck can be fitted to the hull. This arrangement is useful in that it can allow for accommodation of the road vehicle on the hull without it merely being an encumbrance. Indeed the driver's seat of the car or truck can serve as pilot's station of the yacht. The chassis-mounting of a vehicle on the deck eliminates constant swaying on the vehicle's springs which is both detrimental to the road vehicle and to the watercraft, as the oscillating bulk of the car or truck greatly reduces the seaworthiness of the yacht.

Figure 12:
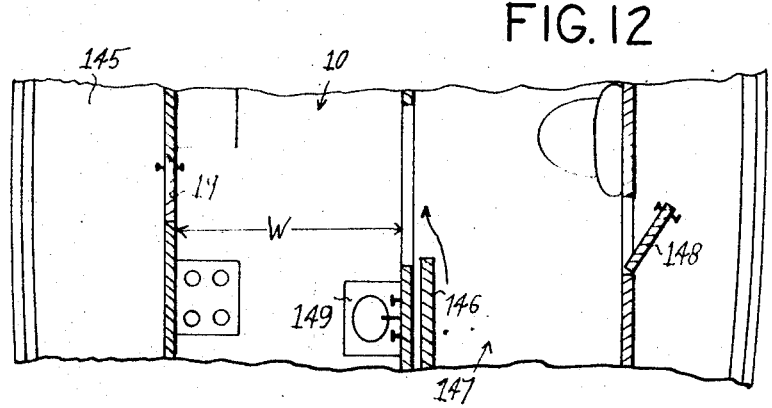
FIG. 12 is a horizontal section through a detail of yet another embodiment of this invention.

As seen in FIG. 12 the motor home 10 of FIG. 1 has a width W of 8 feet, which is the legal maximum for such vehicles. In this arrangement the vehicle 10 is secured to a hull 145 having an overall width equal to 3W. The vehicle 10 has on one side a large sliding door 146 which when open gives access to living quarters 147 on the hull 145. A door 148 of these living quarters 147 is also shown, as is the sink 149 of the home 10.

The combination according to the present invention provides all the advantages of a motor home to be combined with the pleasures of boating. An owner of a motor home can use his vehicle as the living quarters and pilot's cabin of a comfortable yacht. Additional living quarters can be provided in the hull 30 forward or aft of the well 32 if desired. The owner need not unpack his motor home and move into a boat when he desires to go boating, but rather has only to have his slightly modified vehicle fitted to a hull which he may own or rent to form a seaworthy vehicle. The change-over operation is simple to execute and may be accomplished in a very short time.

I claim:

1. A vehicle comprising:
 a road-traveling module including
  a chassis,
  living quarters on said chassis,
  an access door at said living quarters and having a lower edge,
  a pair of road-engaging front wheels spring-mounted on said chassis,
  a pair of road-engaging rear wheels spring-mounted on said chassis,
  an engine on said chassis for driving one of said pairs of said wheels and thereby propelling said module along the ground, and
  a driver's station on said chassis having a steering wheel operatively connected to said front wheels to pivot same and steer said module on the ground and a marine control element; and
 a floatable hull including
  independent drive means including a marine engine operable by said control element and a propeller connected to said marine engine for displacing said hull through the water,
  a deck formed with a single upwardly open well adapted to receive both of said pairs of said wheels and having a well edge formed as a seat snugly engageable all around said module with said chassis with the weight of said module distributed along said well edge,
  jack means in said well having a pair of lift elements each engageable with a respective one of said front wheels and with a respective one of said rear wheels for lifting and lowering said module by said wheels out of and into said well,
  a marine steering element on said hull operable to steer same in the water,
  means operatively connected between said front wheels and said marine steering element for steering said hull in the water from said steering wheel only with said module resting on said seat,
  means operatively connected between said marine control element and marine engine for controlling same only with said module on said seat, and
  means for securing said chassis to said seat in a predetermined stable position with said lift elements out of engagement with said wheels and said lower edge of said door lying substantially on the same level as said deck with said module resting on said seat in said predetermined stable position.

2. The vehicle defined in claim 1 wherein said hull is adapted to ride at a predetermined level in the water and when riding higher than said level is less seakeeping than when riding at said level, said hull riding at said level with said module on said seat and higher than said level absent said module.

3. The vehicle defined in claim 1 wherein said chassis is formed with a plurality of downwardly open recesses and provided with clamping means including positioning elements formed as upwardly directed rods matingly and snugly engageable with said recesses.

4. The vehicle defined in claim 1, wherein said jack means includes a pair of scissor linkages connected between said lift elements and said hull.

5. The vehicle defined in claim 1 wherein said marine steering element is a rudder.

6. The vehicle defined in claim 1 wherein said road-traveling module further comprises a power-steering device operatively connected to and controlled by said steering wheel, said means connected to said marine steering element being connected to said power-steering device.

* * * * *